United States Patent
Factor et al.

(10) Patent No.: US 9,396,343 B2
(45) Date of Patent: Jul. 19, 2016

(54) POLICY ACCESS CONTROL LISTS ATTACHED TO RESOURCES

(71) Applicant: International Business Machines Corporation, Armonk, NY (US)

(72) Inventors: Michael Factor, Haifa (IL); Elliot K Kolodner, Haifa (IL); Alexandra Shulman-Peleg, Givataim (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/517,952

(22) Filed: Oct. 20, 2014

(65) Prior Publication Data

US 2016/0110553 A1 Apr. 21, 2016

(51) Int. Cl.
*G06F 21/62* (2013.01)
*G06F 21/60* (2013.01)
*G11C 29/52* (2006.01)

(52) U.S. Cl.
CPC .......... *G06F 21/604* (2013.01); *G06F 21/6218* (2013.01)

(58) Field of Classification Search
CPC ............... G06F 2221/2141; G06F 21/6209; G06F 21/6236; G06F 21/604; G06F 21/6218
See application file for complete search history.

(56) References Cited

U.S. PATENT DOCUMENTS

| | | | |
|---|---|---|---|
| 6,279,111 B1 * | 8/2001 | Jensenworth | G06F 21/335 713/159 |
| 7,568,097 B2 | 7/2009 | Burnett | |
| 7,774,830 B2 | 8/2010 | Dillaway et al. | |
| 8,418,238 B2 | 4/2013 | Platt et al. | |
| 8,474,018 B2 | 6/2013 | Mardikar et al. | |
| 8,566,906 B2 * | 10/2013 | Gross | G06F 21/00 713/151 |
| 8,595,788 B2 | 11/2013 | Lim | |
| 2002/0019941 A1 * | 2/2002 | Chan | G06F 21/53 713/185 |
| 2006/0206510 A1 * | 9/2006 | Moulhaud | G06F 21/6218 |
| 2007/0156670 A1 * | 7/2007 | Lim | G06F 21/6218 |

(Continued)

OTHER PUBLICATIONS

Sushmita Ruj et al., "DACC: Distributed Access Control in Clouds", 2011 International Joint Conference of IEEE TrustCom-11/IEEE ICESS-11/FCST-11, pp. 91-98.

(Continued)

*Primary Examiner* — Venkat Perungavoor
(74) *Attorney, Agent, or Firm* — Daniel Kligler

(57) ABSTRACT

Methods, storage systems and computer program products implement embodiments of the present invention that include defining, for an entity, a policy access control list including one or more access rules, each of the access rules including one or more user conditions and one or more entity conditions. Upon receiving a request from a user to access a given entity, one or more user attributes associated with the user and one or more entity attributes associated with the given entity are identified. For each of the access rules, the one or more user conditions are applied to the one or more user attributes, the one or more entity conditions are applied to the one or more entity attributes. Access to the given content entity is granted to the user upon determining that a minimum threshold of the one or more user conditions and the one or more entity conditions are met.

12 Claims, 4 Drawing Sheets

(56) References Cited

U.S. PATENT DOCUMENTS

| | | | |
|---|---|---|---|
| 2007/0283443 A1* | 12/2007 | McPherson | G06F 21/6218 726/26 |
| 2008/0163335 A1* | 7/2008 | Hagstrom | G06F 21/6218 726/1 |
| 2010/0088738 A1* | 4/2010 | Birnbach | G06F 21/604 726/1 |
| 2011/0126281 A1* | 5/2011 | Ben-Zvi | G06F 21/6218 726/21 |
| 2012/0216247 A1 | 8/2012 | Gross et al. | |
| 2013/0097203 A1* | 4/2013 | Bhattacharjee | G06F 21/604 707/783 |
| 2013/0212707 A1* | 8/2013 | Donahue | H04L 63/10 726/29 |
| 2013/0218911 A1* | 8/2013 | Li | G06F 21/604 707/754 |
| 2013/0246470 A1 | 9/2013 | Price et al. | |

OTHER PUBLICATIONS

Mary Thompson et al., "Certificate-based Access Control for Widely Distributed Resources", SSYM'99 Proceedings of the 8th conference on USENIX Security Symposium—vol. 8, 1999, pp. 17-17.

Yuri Demchenko et al., "Policy Based Access Control in Dynamic Grid-based Collaborative Environment", Collaborative Technologies and Systems, 2006. CTS 2006. International Symposium on, pp. 64-73, May 14-17, 2006.

* cited by examiner

POLICY ACCESS CONTROL LISTS ATTACHED TO RESOURCES

FIELD OF THE INVENTION

The present invention relates generally to storage systems, and specifically to managing dynamic policy access control lists.

BACKGROUND

Access Control Lists (ACLs) are data models used by computer systems in order to identify a given user's access rights to specific resources in the computer system. Examples of ACL models used in enterprise storage systems include role based access control (RBAC) models and attribute based access control (ABAC) models. RBAC and ABAC models enable system administrators to control access to resources by setting policies based on roles and attributes, and establishment of their hierarchies and relationships.

The description above is presented as a general overview of related art in this field and should not be construed as an admission that any of the information it contains constitutes prior art against the present patent application.

SUMMARY

There is provided, in accordance with an embodiment of the present invention a method, including defining, by a storage system for an entity, a policy access control list (PACL) including one or more access rules, each of the access rules including one or more user conditions and one or more entity conditions, receiving, from a user, a request to access a given entity, identifying, by the storage system, one or more user attributes associated with the user, identifying one or more entity attributes associated with the given entity, for each of the one or more access rules, applying, the one or more user conditions to the one or more user attributes, and applying the one or more entity conditions to the one or more entity attributes, and granting, to the user, access to the given content entity upon determining that a minimum threshold of the one or more user conditions and the one or more entity conditions are met.

There is also provided, in accordance with an embodiment of the present invention a computing facility, including a storage device configured to store an entity, multiple entity attributes associated with the entity, and a policy access control list (PACL) including one or more access rules, each of the access rules including one or more user conditions and one or more entity conditions, and a processor configured to receive, from a user, a request to access the entity, to identify one or more user attributes associated with the user, for each of the one or more access rules, to apply, the one or more user conditions to the one or more user attributes, and to apply the one or more entity conditions to the one or more entity attributes, and to grant, to the user, access to the given content entity upon determining that a minimum threshold of the one or more user conditions and the one or more entity conditions are met.

There is further provided, in accordance with an embodiment of the present invention a computer program product, the computer program product including a non-transitory computer readable storage medium having computer readable program code embodied therewith, the computer readable program code including computer readable program code configured to define, for an entity, a policy access control list (PACL) including one or more access rules, each of the access rules including one or more user conditions and one or more entity conditions, computer readable program code configured to receive, from a user, a request to access a given entity, computer readable program code configured to identify, by the storage system, one or more user attributes associated with the user, computer readable program code configured to identify one or more entity attributes associated with the given entity, computer readable program code configured, for each of the one or more access rules, to apply, the one or more user conditions to the one or more user attributes, and to apply the one or more entity conditions to the one or more entity attributes, and computer readable program code configured to grant, to the user, access to the given content entity upon determining that a minimum threshold of the one or more user conditions and the one or more entity conditions are met.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
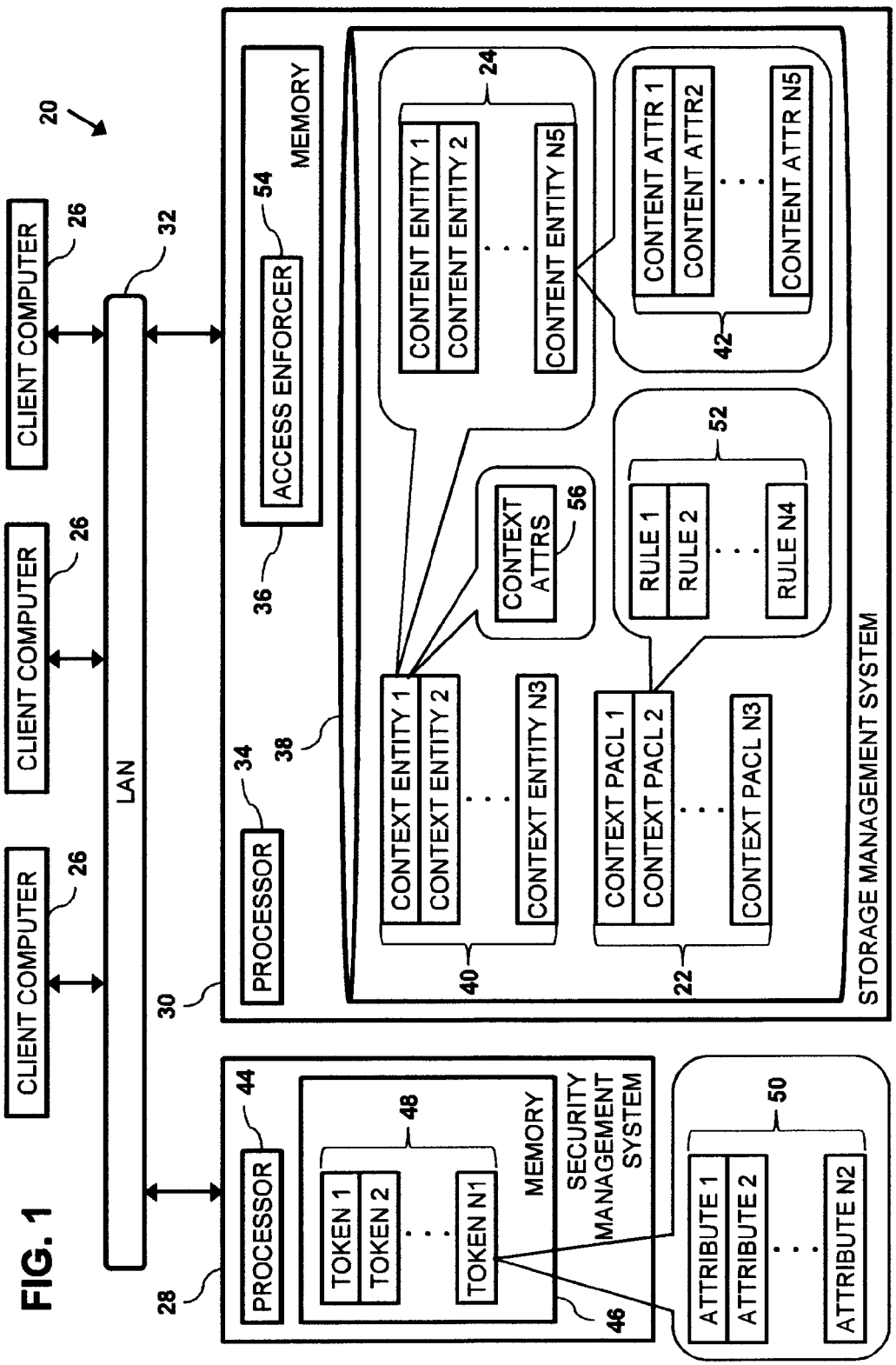
FIG. 1 is a block diagram of a computer facility configured to implement policy access control lists (PACLs) for multiple content objects associated with a context entity, in accordance with an embodiment of the present invention.

As enterprises increasingly migrate data to cloud based storage platforms, role based attribute control (RBAC) servers and attribute based access (ABAC) servers may not be able to scale in order to support large numbers (e.g., billions and even trillions) of data objects. When storing large numbers of objects, ACLs have the following drawbacks:

- ACLs are platform-dependent, and may have different system-dependent formats.
- ACLs are typically limited in their ability to describe complex access control policies (e.g., Linux™ permission bits or NFSv4 ACLs).

Additionally, since ACLs are typically distributed with the resources they protect, their platform dependence is more acute than in other models especially if they are used for data migration or federation of heterogeneous systems.

Embodiments of the present invention provide methods and systems for implementing policy access control lists (PACLs) to restrict access to content entities associated with a context entity (i.e., the context entity provides context the content entities). As described hereinbelow, a given PACL may comprise a list of access control policies that comprises flexible expressions based on dynamically defined attributes.

The PACLs can be implemented using regular expressions. Alternatively, the PACLs may comprise lists of key/value pairs, where the "key" corresponds to an attribute name or an identifier as it is specified in a user token or the system, and the "value" corresponds to an attribute value.

In some embodiments, the PACLs may be attached to the stored resources and may be kept as part of their metadata or headers. For example, the PACLs can be stored in the underlying file system. Alternatively, the PACLs can be maintained in a supplementary data store (e.g., a relational database, distributed catch, or a key-value/NoSQL data store).

The PACLs describe access rights to perform operations on the resources to which they are attached. In some embodiments, these operations can be specified as part of the PACLs (similarly to read/write operations in POSIX or NFSv4 ACLs). In an alternative embodiment, the access rights for each operation may be specified in a dedicated PACL kept as a separate entry. For example, PACLs granting read and write permissions for a file can be kept separately as read-PACLs and write-PACLs. When a new operation (e.g. "transcode") is added to the system a new type of corresponding PACLs may be created.

Additionally, the PACLs may specify policies that apply to groups of items that they control, such as groups of metadata attributes or subsets of lower hierarchy resources. These "group PACLs" can be important for providing an even finer grained authorization for items that are not controlled by dedicated PACLs.

In a first embodiment, group PACLs may be used in storage systems (e.g., cloud based storage systems) that implement coarse grained access control at a container/bucket/directory level for providing fine grained permissions at object/file levels. In the first embodiment, PACLs at higher levels (e.g. container or directory levels) may contain rules controlling the access to the underlying objects based on their properties (e.g., only users with role "editor" may access all container objects of type "audio or video").

In a second embodiment, group PACLs may store access permissions to groups of a given resource's attributes, and specify who can access one or more metadata attributes. For example, in a healthcare scenario, a given group PACLs may grant system administrators access to system metadata attributes (e.g., a file creation time or a file size), but prevent the administrators from accessing attributes with personal information (e.g., fields with patient information such as name and identifications).

PACLs enable storage systems to control access to subgroups of items or lower level resources lacking dedicated authorization mechanisms. Specifically, such "group PACLs" may contain policies that apply to groups of items that they control. This allows authorizing fine-grained operations on resources that do not have dedicated authorization mechanisms. For example, in systems without fine-grained access control at the object level, "group PACLs" at the container level may contain access rules that apply to groups of objects in the container. In another embodiment "group PACLs" may control access to groups of metadata attributes.

Systems implementing embodiments of the present invention can allow the attributes expressed in PACLs to change dynamically, thereby eliminating the need to modify the software managing access to the system's resources. Additionally, when performing user authorizations, these systems may enable each authorization decision to be made without communicating with external systems such as security managers or policy servers, thereby providing a cloud-scale system with enterprise-grade access control.

Furthermore, systems implementing embodiments of the present invention can use PACLs to authorize a wide range of operations which are not required to be pre-defined. Since the PACLs may comprise policies that specify access rights based on dynamic attributes, new operations can be easily added anytime and each operation can be authorized by a different set of PACLs policies.

System Description

FIG. 1 is a block diagram of a computer facility 20 configured to utilize context policy access control lists (PACLs) 22 to authorize access to content entities 24 (also referred to herein as sub-entities), in accordance with an embodiment of the present invention. Content entities comprise data objects that store content. Examples of content entities include, but are not limited to files and binary large objects (BLOBS).

Facility 20 comprises client computers 26, a security management system 28, and a storage management system 30 that communicate over a local area network (LAN) 32. Storage management system 30 comprises a storage processor 34, a memory 36, and a storage device 38 such as a disk drive and a solid state drive. While the configuration in FIG. 1 shows a single storage management system 30 comprising a single storage device 38, other configurations are considered to be within the spirit and scope of the present invention. For example, facility 20 may comprise one or more storage management systems 30, and each of the storage management systems may comprise multiple storage devices 38. Alternatively, storage management system 30 may comprise a distributed cloud based storage system that communicates with computers 26 and system and 30 via a wide area network.

In response to storage commands received from computers 26 via LAN 32, processor 34 manages content entities 24 responsively to the storage commands. Examples of managing content entities 24 include, but are not limited to, creating a given content entity 24, renaming the given content entity, reading data from the given content entity, writing data to the given content entity, and deleting the given content entity.

Processor 34 also manages one or more context entities 40 on storage device 38 by associating a given context entity 40 with one or more content entities 24, and arranging the given context entity to provide context (i.e., manage storage parameters) for the one or more content entities. Each context entity 40 comprises a data structure that provides context to (i.e., stores and/or references) one or more content entities 24 (and/or one or more additional context entities 40). Examples of context entities 40 include folders, repositories, cloud storage containers and buckets. In embodiments where a given content entity 24 comprises a BLOB and a given context entity 40 comprises a container, processor 34 can associate the given content entity with the given context entity (and the given context entity can provide context to the given content entity) by storing the BLOB to the container.

For each given content entity 24, storage system 30 stores one or more content entity attributes 42 that comprise metadata describing the given content entity. Additionally, storage system 30 may store one or more context entity attributes 56 for each context entity 40. Examples of attributes 42 and 56 include, but are not limited to, an entity type (e.g., a JPEG image), a creation date, a last modification date, a retention date, and privacy settings.

Security management system 28 comprises a security processor 44 and a security memory 46 that stores user tokens 48. Each token 48 represents a respective user (not shown) of computers 26 in facility 20 (i.e., each token 48 has a corresponding user). User tokens 48 comprise user attributes 50 that comprise metadata that describes the users. Examples of user attributes 50 include, but are not limited to a user name, a role (e.g., a title), a group name, a location, and an email address.

In embodiments of the present invention, processor 34 manages context policy access control lists (context PACLs) on storage device 38. In some embodiments, the context PACLs can be stored in the storage system's underlying file system, or as stored as supplementary data store (e.g., a relational database or a NoSQL data store).

Each context PACL 22 has a corresponding context entity 40 and comprises one or more context access rules 52 that control access to the content entities stored in the corresponding context entity. Typically, each context access rule 52 comprises one or more context user conditions and/or and one or more context entity conditions that are defined by a user of facility 20. The context entity conditions are logical conditions based on content attributes 42 and/or context entity attributes 56, and the context user conditions are logical conditions based on user attributes 50. In some embodiments, processor 34 executes, from memory 36 an access enforcer application 54 that is configured, using embodiments described herein, to manage access to content entities 24 based on user attributes 50, entity attributes 42, context attributes 56, content PACLs 58 and context PACLs 22.

For example, if a first user stores digital photographs (i.e., content entities 24) in a given context entity 40 labeled "photos", the first user can define a first context access rule that restricts access to the digital photographs to additional users that have a given user attribute 50 that indicates that the first user and the additional users belong to a group called "family".

If the first user wants to further restrict access to one or more of the photographs, the first user can add an entity attribute 42 to the one or more photographs indicating that the one or more photographs are "private", and add an additional context access rule 52 that restricts access to "private" photographs to the first user.

In embodiments of the present invention, upon detecting a second user logging into a given computer 26, processor 44 conveys, to the given computer, the user's corresponding token comprising a given user attribute 50 indicating that the second user belongs to the "family" group. If the second user wants to view the photographs in the "photos" context entity, access enforcer 54 can apply the first and the second context access rules to the second user's respective user attributes 50 and the photographs respective entity attributes 42, to enable the second user to view all of the photographs in the given context entity that do not have the "private" entity attribute.

Figure 2:
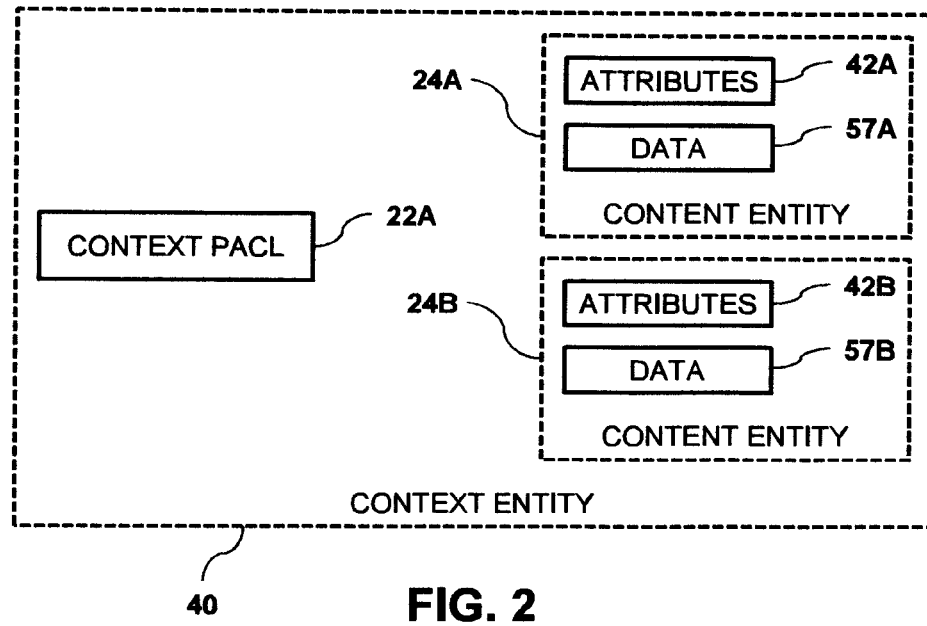
FIG. 2 is a block diagram that shows a context entity and its associated PACL and content entities, in accordance with a first embodiment of the present invention.

FIG. 2 is a block diagram that shows a first given context entity 40 and its associated context PACL 22 and content entities 24, in accordance with a first embodiment of the present invention. In the example shown in FIG. 2, content entities 24 and their respective components can be differentiated by appending a letter to the identifying numeral, so that the content entities comprise content entities 24A and 24B.

Each content entity 24 comprises content data 57 (also referred to herein as a data object) and has associated entity attributes 42 (also referred to herein as object attributes), as described supra. The first given context entity provides context to content entities 24A and 24B, and processor 34 can control access to content entities 24A and 24B via context PACL 22A. In other words context PACL 22A controls access to all content entities 22 that are provided context by the first given context entity.

Figure 3:
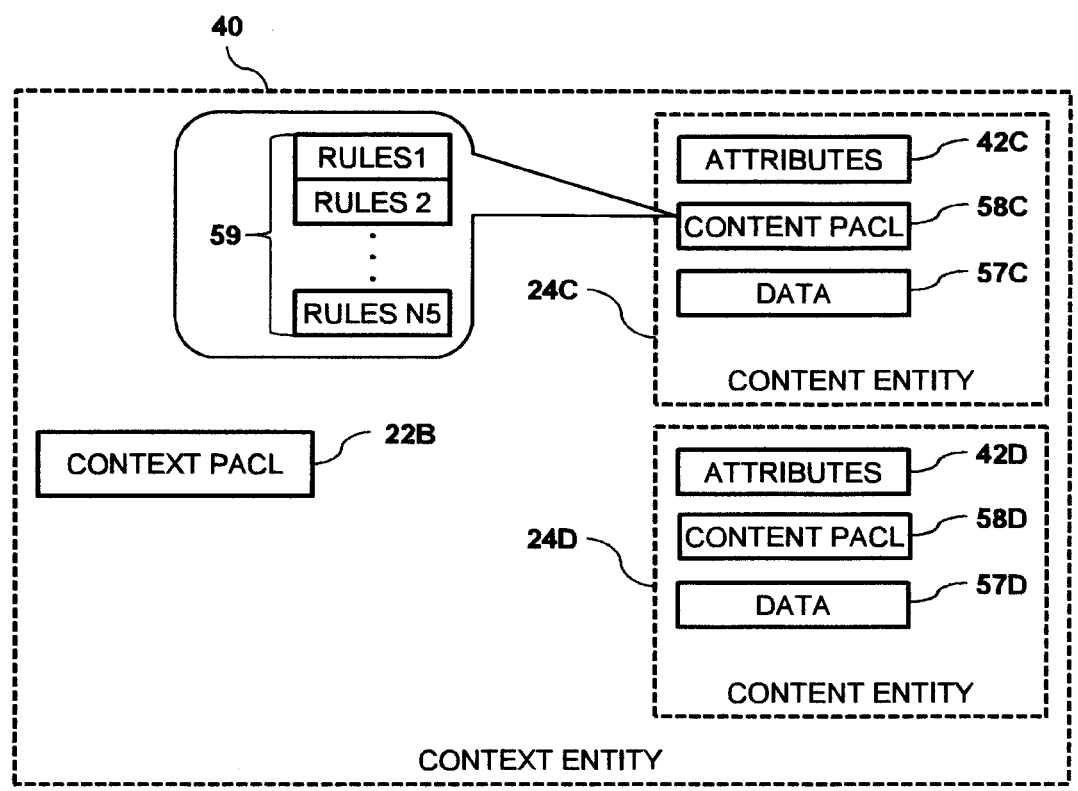
FIG. 3 is a block diagram that shows a context entity and its associated PACL and content entities, in accordance with a second embodiment of the present invention.

FIG. 3 is a block diagram that shows a second given context entity 40, in accordance with an embodiment of the present invention. In the example shown in FIG. 3, content entities 24 and their respective components can be differentiated by appending a letter to the identifying numeral, so that the content entities comprise content entities 24C and 24D.

In the example shown in FIG. 3, each given content entity 24 has an associated content PACL 58 that controls access to the given content entity. Each content PACL 58 comprises one or more content access rules 59, and each of the content access rules comprises one or more content user conditions and one or more content entity conditions. The content entity conditions are logical conditions based on content attributes 42, and the content user conditions are logical conditions based on user attributes 50.

In embodiments of the present invention, if a given content entity 24 has an associated content PACL 58 having one or more content access rules (i.e., in addition to an associated context PACL 22 having one or more context access rules 52), processor 34 can grant access to the given content entity upon, for each of the one or more context access rules and each of the one or more content access rules, the one or more context user conditions and the one or more content user conditions being met by the one or more user attributes 50, and the one or more context entity conditions and the one or more content entity conditions being met by the one or more entity attributes 42.

Processors 34 and 44 typically comprise general-purpose computers, which are programmed in software to carry out the functions described herein. The software may be downloaded to systems 28 and 30 in electronic form, over a network, for example, or it may be provided on non-transitory tangible media, such as optical, magnetic or electronic memory media. Alternatively, some or all of the functions of processors 34 and may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Managing Distributed System Metadata

Figure 4:
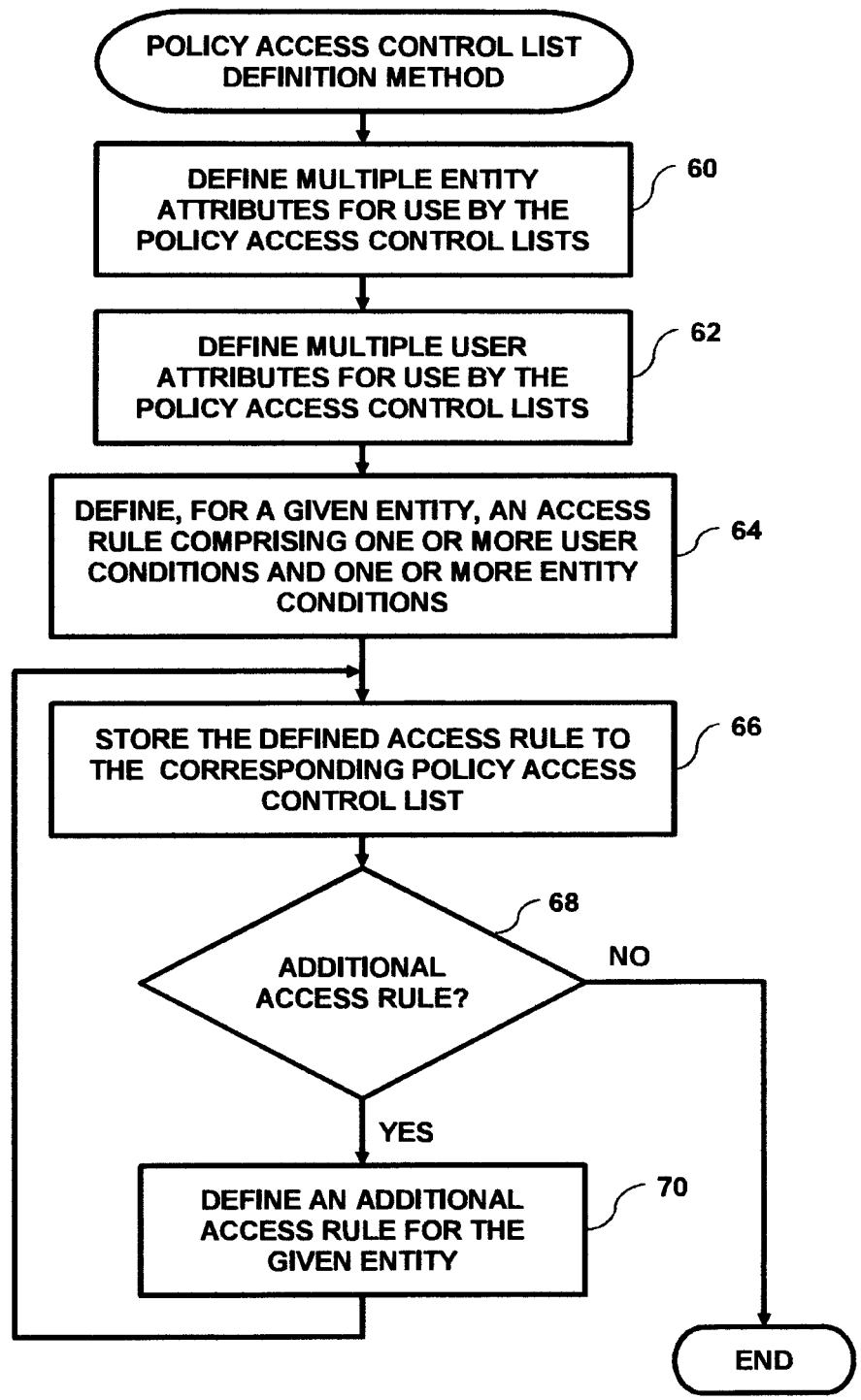
FIG. 4 is a flow diagram that schematically illustrates a method of defining a given PACL for a given content entity, in accordance an embodiment of the present invention.

FIG. 4 is a flow diagram that describes a method of defining a given policy access control list (PACL), in accordance with an embodiment of the present invention. The given PACL may comprise a context PACL 22 or a content PACL 58.

In a first attribute definition step 60, a system administrator for facility 20 defines multiple entity attributes. Each of the entity attributes comprises a given content entity attribute 42 or a given context entity attribute 56. In a user attribute definition step 62, the system administrator defines one or more user attributes 50.

In a first access rule definition step 64, the system administrator defines (e.g., via a given computer 26), for a given entity, a given access rule. The given access rule comprises one or more user conditions and/or one or more entity conditions. If the given PACL comprises a context PACL 22, then given access rule comprises a context access rule 52. If the given PACL comprises a content PACL 58, then the given access rule comprises a content access rule 59.

For example, the given access rule may comprise (a) a context user condition that checks if the user has a user attribute 50 indicating the that the user is a member of a group called "family", and (b) an context entity condition that checks if a given content entity 24 in the given context entity has an entity attribute 42 indicating that the given context entity is an image.

In a store step 66, processor 34 stores the given access rule in the corresponding PACL 22 the given entity. In a comparison step 68, if the system administrator wants to define an additional access rule for the given entity, the system administrator defines the additional access rule in a second access definition step 70, and the method continues with step 66. Returning to step 68, if there are no more access rules for the given entity, then the method ends.

For example, the additional rule may comprise (a) a context user condition that checks if the user has the user attribute indicating that the user is a member of the "family" group, and (b) an entity attribute 42 that checks if a given content entity 24 has an entity attribute 42 indicating that the given content entity is "private". Therefore the context access rules in the given context PACL can grant, to a user having a user attribute 50 indicating that the user is a member of the "family" group, viewing access to content entities 24 in the given context entity that do not have a "private" entity attribute 42.

In some embodiments, the access rules in the PACLs in storage system 30 may authorize different types of access to the entities, such as read/write, read-only. In additional embodiments, the PACLs may authorize operations on the entities such as:

Conversion rules that define how to convert data in a given entity from a first format to a second format. In one embodiment the conversion may comprise changing the data format of data 57 for given content entity 40. In other embodiments, converting the conversion may comprise changing the format of the given entity's attributes. For example, processor 34 can reformat the entity attributes from "XML" to "JSON" and vice-versa.

Data migration rules that define, for example in a cloud storage environment, how to migrate a given entity from a first data cloud location (also referred to herein as a first storage system) to a second data cloud location (also referred to herein as a second storage system). In some embodiments, the migration may comprise migrating the entity attributes of the given entity from the first data location to the second data cloud location. Examples of the first and the second data cloud locations include, but are not limited to, cloud-based storage systems and content management systems.

Figure 5:
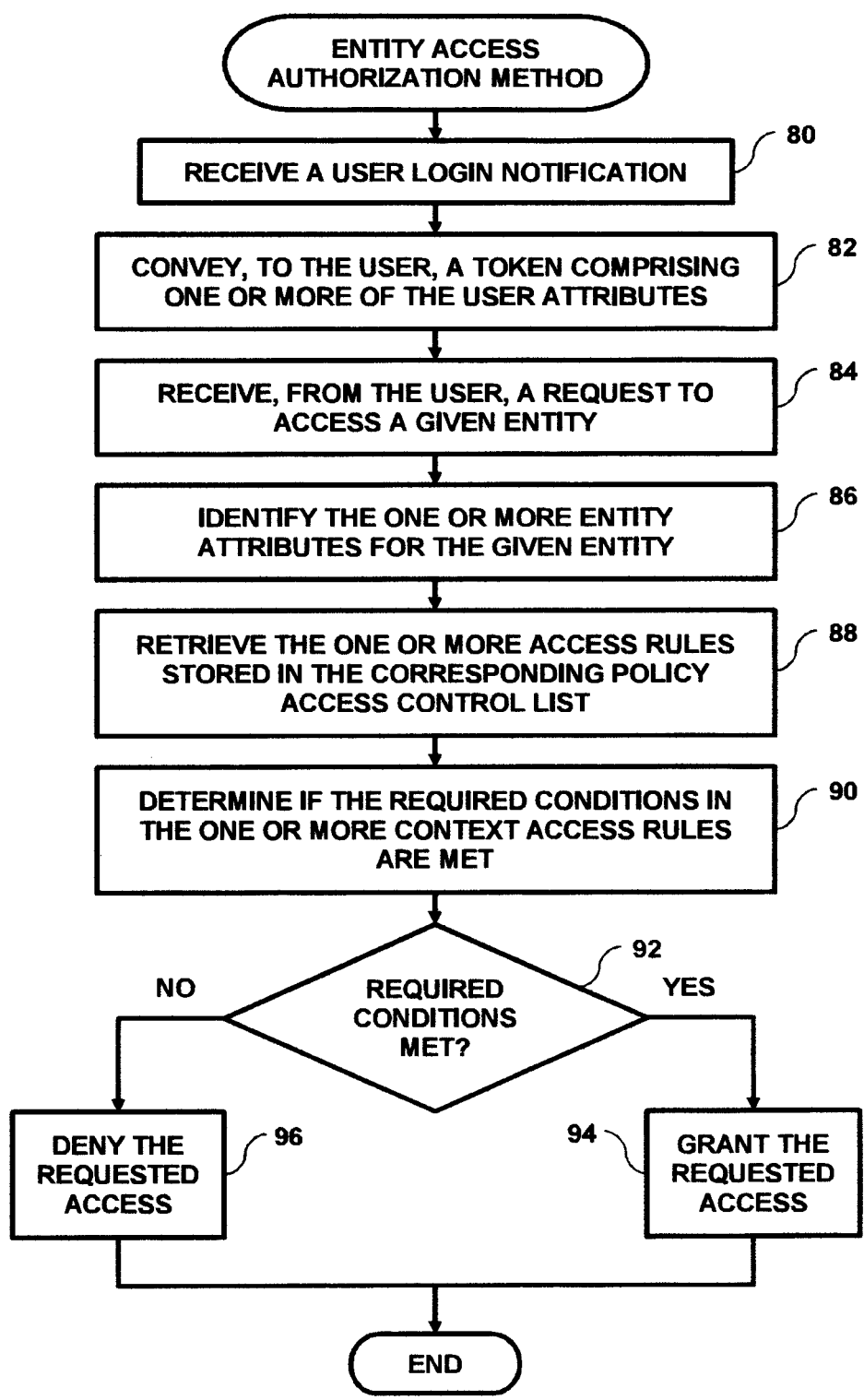
FIG. 5 is a flow diagram that schematically illustrates a method of using a given PACL to grant access to a given content entity, in accordance an embodiment of the present invention.

FIG. 5 is a flow diagram that describes a method authorizing access of a given entity (i.e., a given content entity 24 or a given context entity 40) to a user, in accordance with an embodiment of the present invention. In a login step 80, processor 44 receives, from a given client computer 26, a login notification indicating that a user has logged into facility 20. In response to the login request, processor 44 identifies a given token 48 that is associated with the user, and conveys, in a convey step 82, the given token to the given computer.

In a receive step 84, processor 34 receives a request, from the user, to access a given entity. In embodiments of the present invention, the request includes the given token that includes one or more user attributes 50. Processor 34 processes the token by identifying the one or more user attributes stored in the token.

In response to the request, processor 34 identifies (i.e., retrieves) the entity attributes for the given content entity in an identification step 86. If the given entity comprises a given content entity 24 that has its context provided by a given context entity 40, then the entity attributes comprise content attributes 42 and/or context attributes 56. If the given entity comprises a given context entity 40, then the entity attributes comprise context attributes 56.

In a retrieval step 88, retrieves the PACL for the given entity, thereby identifying one or more access rules (i.e., content access rules and/or context access rules) associated with the given entity. As described supra, the identified access rules comprise one or more user conditions and one or more entity conditions.

If the given entity comprises a first context entity 40 or a given content entity 24 that is provided context by a second context entity 40, then the retrieved PACL comprises a given context PACL 22 comprising context access rules 52. If the given content entity has an associated content PACL 58, then the retrieved PACL comprises the given context PACL and the associated content PACL comprising content access rules 59 (i.e., the access rules may comprise both the context and the content access rules).

In a determination step 90, processor 34 determines the required (i.e., a minimum threshold) of the access rules are in the retrieved PACL are met. It is sufficient that one of the user conditions and/or entity conditions (also referred to herein simply as conditions) in the access rule is met. Alternatively, criteria such as "all of the conditions met" or "at least three of the conditions met" can be set.

To perform the determination step, processor 34 checks if the one or more user conditions in the retrieved PACL are met by the one or more user attributes 50 received in step 84, and checks if the one or more entity conditions in the retrieved PACL are met by the one or more entity attributes identified in step 86.

If the given entity comprises a given content entity 24 provided context by a given context entity 40, then processor 34 checks if the one or more context user conditions in the associated context PACL and the one or more content user conditions in the associated content PACL are met by the one or more user attributes 50 received in step 84, and checks if the one or more context entity conditions in the associated context PACL and the one or more content entity conditions in the associated content PACL are met by the one or more entity attributes 42 identified in step 86.

In a comparison step 92, if the required user conditions and all the entity conditions in the determination step are met, then processor 34 grants the requested access to the user in an approval step 94, and the method ends. However, if any of the user conditions or any of the entity conditions are not met, then processor 34 denies the requested access to the user in a denial step 96 and the method ends.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
defining, by a storage system for a plurality of entities, a policy access control list (PACL) comprising one or more access rules, each of the access rules comprising one or more user conditions and one or more entity conditions, wherein the plurality of entities comprise a context entity and a content entity;

receiving, from a user, a request to access a given entity;

identifying, by the storage system, one or more user attributes associated with the user;

identifying one or more entity attributes associated with the given entity;

for each of the one or more access rules, applying, the one or more user conditions to the one or more user attributes, and applying the one or more entity conditions to the one or more entity attributes;

granting, to the user, access to the given content entity upon determining that a minimum threshold of the one or more user conditions and the one or more entity conditions are met; and providing, by the context entity, context to multiple content entities, and wherein the entity comprises entities comprise a given content entity, and wherein the entity attributes comprise content entity attributes, wherein each of the entity attributes is selected from a list comprising a context entity attribute and a content entity attribute, and wherein the PACL comprises a context PACL, and wherein each of the user conditions comprises a context user condition, and wherein each of the entity conditions comprises a context entity condition, wherein the PACL comprises a content PACL, and wherein each of the user conditions comprises an additional content user condition, and wherein each of the entity conditions comprises a content entity condition, wherein granting access to the given entity comprises migrating the given content entity from a first storage system to a second storage system, and wherein the PACL comprises one or more entity migration conditions and one or more entity migration rules, and wherein migrating the given entity comprises using the one or more entity migration conditions and the one or more entity migration rules.

2. The method according to claim 1, wherein each of the content entities comprises a data object storing data content, and wherein each of the content entity attributes comprises an object attribute for a given data object.

3. The method according to claim 1, wherein each of the context entities is selected from a list consisting of a cloud storage container, a bucket, a folder and a repository.

4. The method according to claim 1, wherein granting access to the given entity comprises converting the given entity from a first format to a second format.

5. The method according to claim 4, wherein converting the given entity comprises converting the associated entity attributes from the first format to the second format.

6. The method according to claim 4, wherein the PACL comprises one or more entity conversion rules and one or more entity conversion conditions, and wherein converting the given entity comprises using the one more entity conversion rules and the one or more entity conversion conditions.

7. The method according to claim 1, wherein migrating the given entity comprises migrating the associated entity attributes from the first storage system to the second storage system.

8. The method according to claim 1, wherein each of the first and the second storage systems is selected from a list consisting of a storage system, cloud system and a content management system.

9. The method according to claim 1, wherein identifying the one or more entity attributes comprises retrieving, from the storage system, the one or more entity attributes associated with the given entity.

10. The method according to claim 1, wherein identifying the one or more user attributes comprises receiving and processing an access token comprising the one or more user attributes.

11. A storage system, comprising:

a storage device configured to store a plurality of entities, and a policy access control list (PACL) comprising one or more access rules, each of the access rules comprising one or more user conditions and one or more entity conditions, wherein the plurality of entities comprise a context entity and a content entity; and a processor configured:

to receive, from a user, a request to access a given entity;

to identify one or more user attributes associated with the user;

to identify one or more entity attributes associated with the given entity;

for each of the one or more access rules, to apply, the one or more user conditions to the one or more user attributes, and to apply the one or more entity conditions to the one or more entity attributes;

to grant, to the user, access to the given content entity upon determining that a minimum threshold of the one or more user conditions and the one or more entity conditions are met; and to provide, by the context entity, context to multiple content entities, and wherein the entity comprises entities comprise a given content entity, and wherein the entity attributes comprise content entity attributes, wherein each of the entity attributes is selected from a list comprising a context entity attribute and a content entity attribute, and wherein the PACL comprises a context PACL, and wherein each of the user conditions comprises a context user condition, and wherein each of the entity conditions comprises a context entity condition, wherein the PACL comprises a content PACL, and wherein each of the user conditions comprises an additional content user condition, and wherein each of the entity conditions comprises a content entity condition, wherein the processor is configured to grant access to the given entity by migrating the given content entity from a first storage system to a second storage system, and wherein the PACL comprises one or more entity migration conditions and one or more entity migration rules, and wherein the processor is configured to migrate the given entity by using the one or more entity migration conditions and the one or more entity migration rules.

12. A computer program product, the computer program product comprising:

a non-transitory computer readable storage medium having computer readable program code embodied therewith, the computer readable program code comprising:

computer readable program code configured to define, for a plurality of entities, a policy access control list (PACL) comprising one or more access rules, each of the access rules comprising one or more user conditions and one or more entity conditions, wherein the plurality of entities comprise a context entity and a content entity;

computer readable program code configured to receive, from a user, a request to access a given entity;

computer readable program code configured to identify, by the storage system, one or more user attributes associated with the user;

computer readable program code configured to identify one or more entity attributes associated with the given entity;

computer readable program code configured, for each of the one or more access rules, to apply, the one or more user conditions to the one or more user attributes, and to apply the one or more entity conditions to the one or more entity attributes;

computer readable program code configured to grant, to the user, access to the given content entity upon determining that a minimum threshold of the one or more user conditions and the one or more entity conditions are met; and computer readable program code configured to provide, by the context entity, context to multiple content entities, and wherein the entity comprises entities comprise a given content entity, and wherein the entity attributes comprise content entity attributes, wherein each of the entity attributes is selected from a list comprising a context entity attribute and a content entity attribute, and wherein the PACL comprises a context PACL, and wherein each of the user conditions comprises a context user condition, and wherein each of the entity conditions comprises a context entity condition, wherein the PACL comprises a content PACL, and wherein each of the user conditions comprises an additional content user condition, and wherein each of the entity conditions comprises a content entity condition, wherein the computer readable program code is configured to grant access to the given entity by migrating the given content entity from a first storage system to a second storage system, and wherein the PACL comprises one or more entity migration conditions and one or more entity migration rules, and wherein the computer readable program code is configured to migrate the given entity by using the one or more entity migration conditions and the one or more entity migration rules.

* * * * *